Nov. 20, 1923.

W. FORBER 1,474,771

TRUCK FOR TRAMCARS AND THE LIKE

Filed July 20, 1923

Inventor
William Forber
By Sturtevant & Mason
Attorneys

Patented Nov. 20, 1923.

1,474,771

UNITED STATES PATENT OFFICE.

WILLIAM FORBER, OF ST. HELENS, ENGLAND.

TRUCK FOR TRAMCARS AND THE LIKE.

Application filed July 20, 1923. Serial No. 652,822.

*To all whom it may concern:*

Be it known that I, WILLIAM FORBER, a subject of the King of Great Britain, residing in St. Helens, in the county of Lancaster and Kingdom of England, have invented certain new and useful Improvements in and relating to Trucks for Tramcars and the like, of which the following is a specification.

The present invention relates to improvements in trucks for tram cars and the like of the type in which the wheels are mounted on axles in a bogie-frame rotatable relatively to the car frame, inclined planes being arranged between the axle frame and the car frame so that after these parts have moved relatively to one another the weight of the car will tend to restore the wheel axles to their normal position when the restraining influence of the rails at a curve on the wheel axles has been removed.

The invention is more particularly described with reference to the accompanying drawings in which:—

Figure 1:
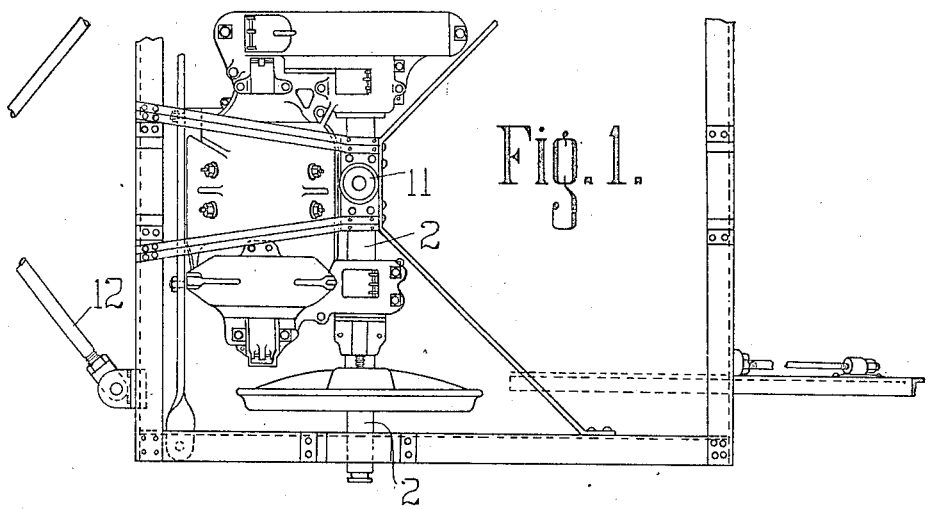
Figure 1 is part of a plan view of the under frame of a tramcar.
Figure 2:
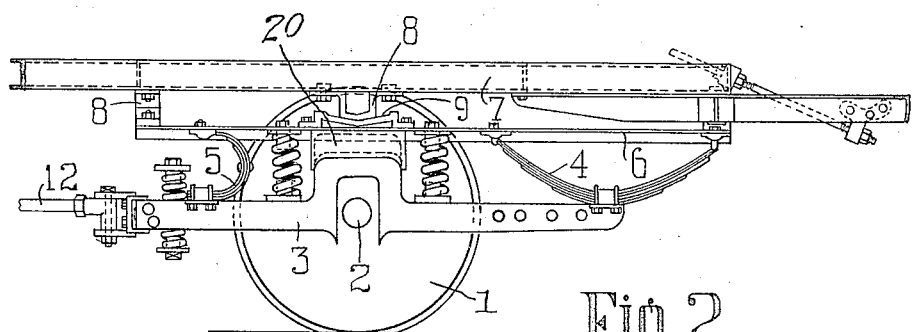
Figure 2 is a corresponding side elevation.
Figure 3:
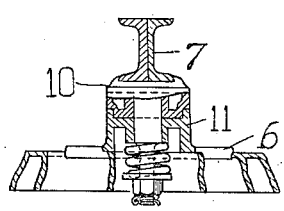
Figure 3 is a detail.

Wheels 1 are mounted on an axle 2 mounted in guides in the sub-frame 3 carried by springs 4, 5 on the intermediate frame 6 connected to be rotatable relatively to the under-frame 7 of the tramcar. This intermediate frame 6 is guided on the frame 3 by means of horn blocks 20. The under-frame 7 rests upon frame 6 by means of shoes 8 presenting an inclined surface, the apex of which normally lies above the center of the axle 2. Each shoe 8 rests upon inclined plane surfaces 9 formed on the frame 6 which form inclined planes on which the shoe 8 can slide whenever the sub-frame is twisted or turned relatively to the under-frame 7.

It will consequently be seen that should the axle 2 be deviated from the position at right angles to the longitudinal axis of the vehicle the shoes will ride up the inclined planes 9, but the weight of the vehicle will always tend to restore the shoe 8 to the position shown.

Side displacement of the axle is controlled by arranging concentric guide surfaces 10, 11 between the under frame 7 and the intermediate frame 6.

The two sub-frames of a car can be connected together by cross tie rods 12 if so desired, so that the front or rear axles will always tend to lie radially to the curve around which the vehicle is travelling. The provision of these tie-rods 12 is however, not essential, but their presence facilitates re-railing of the wheels in case of de-railment.

I declare that what I claim is:—

A tramway vehicle truck comprising a car under-frame, an intermediate frame beneath said underframe, a sub-frame beneath said intermediate frame and provided with guides, a wheel axle mounted in said guides, means to prevent relative horizontal displacement of the sub-frame on said intermediate frame, spring supports between said intermediate frame and sub-frame, reversely arranged inclined planes on the upper surface of said intermediate frame over said wheel axle, a cooperative shoe on the underside of said under-frame, over said wheel axle and supported on said inclined planes for allowing automatic return of the intermediate frame after partial rotation from the horizontal plane relatively to said under frame.

In witness whereof, I have hereunto signed my name this 6th day of July, 1923, in the presence of two subscribing witnesses.

WILLIAM FORBER.

Witnesses:
FRANK WATSON,
ALFRED C. ASHTON.